US012690000B2

(12) United States Patent
Liang et al.

(10) Patent No.: US 12,690,000 B2
(45) Date of Patent: Jul. 21, 2026

(54) METHOD FOR TIME SYNCHRONIZATION, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Bin Liang, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 317 days.

(21) Appl. No.: 18/527,216

(22) Filed: Dec. 1, 2023

(65) Prior Publication Data

US 2024/0098672 A1      Mar. 21, 2024

Related U.S. Application Data

(63) Continuation of application No. PCT/CN2021/098463, filed on Jun. 4, 2021.

(51) Int. Cl.
H04W 56/00          (2009.01)
(52) U.S. Cl.
CPC ................................. H04W 56/005 (2013.01)
(58) Field of Classification Search
CPC ............. H04W 56/004; H04W 56/005; H04W 56/0045; H04W 56/0055
See application file for complete search history.

(56) References Cited

U.S. PATENT DOCUMENTS

| | | | |
|---|---|---|---|
| 12,108,353 B2 * | 10/2024 | Sun ........................ | H04W 56/00 |
| 2017/0195981 A1 * | 7/2017 | Shor ................... | H04W 56/009 |
| 2020/0322908 A1 * | 10/2020 | Prakash .............. | H04W 56/004 |
| 2021/0360548 A1 * | 11/2021 | Chandramouli .. | H04W 56/0015 |
| 2022/0070808 A1 * | 3/2022 | Jacobsen ........... | H04W 56/0035 |

(Continued)

FOREIGN PATENT DOCUMENTS

| | | |
|---|---|---|
| CN | 111770565 | 10/2020 |
| CN | 112425192 | 2/2021 |

(Continued)

OTHER PUBLICATIONS

EPO, Extended European Search Report for EP Application No. 21943592.2, Jun. 25, 2024.

(Continued)

*Primary Examiner* — Kenny S Lin
(74) *Attorney, Agent, or Firm* — Hodgson Russ LLP

(57) ABSTRACT

A method for time synchronization includes: sending first information to a network device, wherein the first information is used to indicate propagation delay compensation manners that are supported by a terminal device; receiving second information from the network device; and performing propagation delay compensation according to a target propagation delay compensation manner related to the second information, wherein the target propagation delay compensation manner is one of the propagation delay compensation manners that are supported by the terminal device, or the target propagation delay compensation manner is a propagation delay compensation manner that is decided by the terminal device itself.

20 Claims, 9 Drawing Sheets

Send first information to a network device, wherein the first information is used to indicate propagation delay compensation manners that are supported by a terminal device ——S310

The terminal device receives second information from the network device ——S320

Perform propagation delay compensation according to a target propagation delay compensation manner related to the second information, wherein the target propagation delay compensation manner is one of the propagation delay compensation manners that are supported by the terminal device, or the target propagation delay compensation manner is a propagation delay compensation manner that is decided by the terminal device itself ——S330

(56)     References Cited

U.S. PATENT DOCUMENTS

| | | | | | |
|---|---|---|---|---|---|
| 2022/0240205 | A1* | 7/2022 | Chien | ............... | H04W 56/0055 |
| 2022/0240208 | A1* | 7/2022 | Chien | ................. | H04W 56/004 |
| 2023/0056527 | A1* | 2/2023 | Medles | ............ | H04W 56/0065 |
| 2023/0134036 | A1* | 5/2023 | Larsson | ............ | H04W 56/0055 |
| | | | | | 370/350 |
| 2023/0171725 | A1* | 6/2023 | Singh | ................ | H04W 56/0045 |
| | | | | | 370/350 |
| 2023/0180157 | A1* | 6/2023 | Chandramouli | .... | H04W 56/001 |
| | | | | | 370/350 |
| 2023/0284166 | A1* | 9/2023 | Kolding | ............ | H04W 56/0045 |
| | | | | | 370/503 |
| 2023/0370991 | A1* | 11/2023 | Min | ................... | H04W 56/0045 |
| 2023/0413202 | A1* | 12/2023 | Guduru | ............ | H04W 28/0268 |
| 2023/0413204 | A1* | 12/2023 | Babaei | ............. | H04W 56/0045 |
| 2024/0057006 | A1* | 2/2024 | Fu | .................... | H04W 56/0045 |

FOREIGN PATENT DOCUMENTS

| | | | | |
|---|---|---|---|---|
| EP | 3897048 A1 | * | 10/2021 | ........ H04W 56/0015 |
| WO | 2020258032 | | 12/2020 | |

OTHER PUBLICATIONS

Ericsson, "Summary on Enhancements for support of time synchronization (8.5.2)," 3GPP TSG-RAN WG2 #113-e, Tdoc R2-2102071, Jan. 2021.

Huawei et al., "Initial discussion on Rel-17 URLLC RRM," 3GPP TSG-RAN WG4 Meeting #99-e, R4-2110915, May 2021.

Oppo, "Enhancement for Propagation Delay Compensation," 3GPP TSG RAN WG1 #103-e, R1-2008283, Oct. 2020.

WIPO, International Search Report and Written Opinion for PCT/CN2021/098463, Feb. 28, 2022.

* cited by examiner

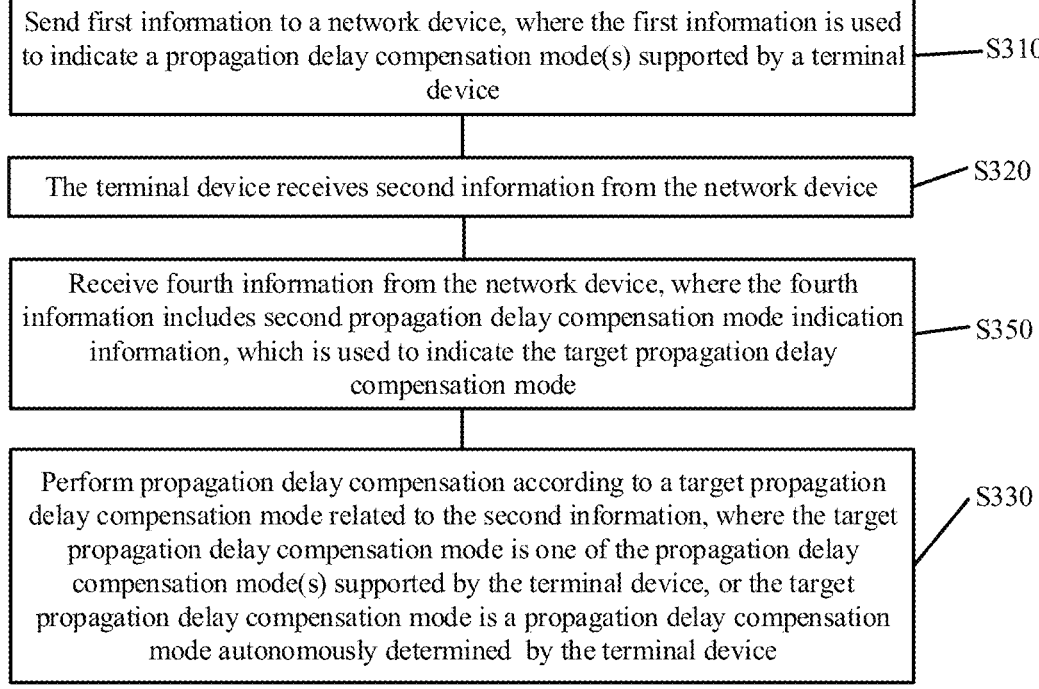

Send first information to a network device, where the first information is used to indicate a propagation delay compensation mode(s) supported by a terminal device ——S310

The terminal device receives second information from the network device ——S320

Receive fourth information from the network device, where the fourth information includes second propagation delay compensation mode indication information, which is used to indicate the target propagation delay compensation mode ——S350

Perform propagation delay compensation according to a target propagation delay compensation mode related to the second information, where the target propagation delay compensation mode is one of the propagation delay compensation mode(s) supported by the terminal device, or the target propagation delay compensation mode is a propagation delay compensation mode autonomously determined by the terminal device ——S330

FIG. 5

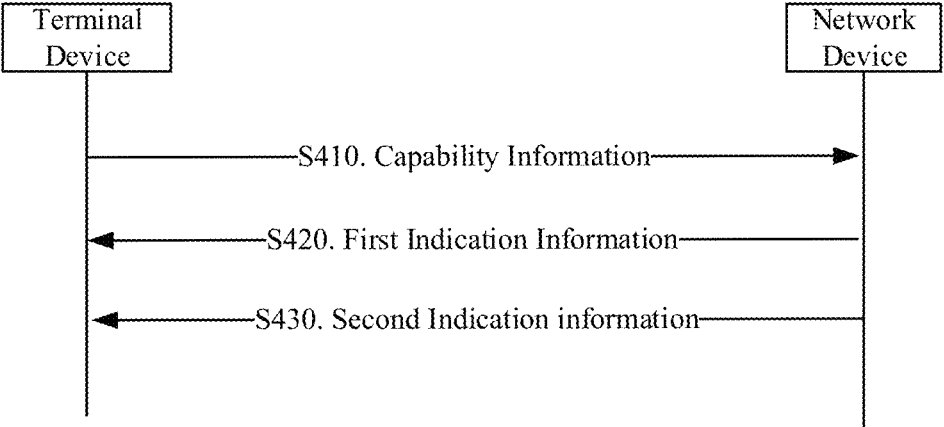

Terminal Device

Network Device

S410. Capability Information

S420. First Indication Information

S430. Second Indication information

FIG. 6

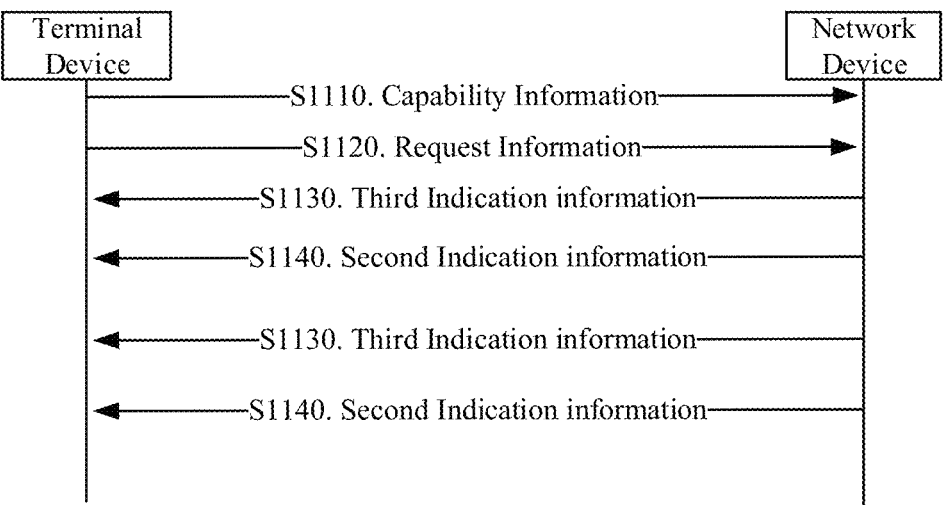

FIG. 13

Receive first information from a terminal device, where the first information is configured to indicate a propagation delay compensation mode supported by the terminal device ———S1210

Send second information to the terminal device, where the second information is used by the terminal device to perform propagation delay compensation according to a target propagation delay compensation mode related to the second information, where the target propagation delay compensation mode is one of the propagation delay compensation mode(s) supported by the terminal device, or the target propagation delay compensation mode is a propagation delay compensation mode autonomously determined by the terminal device    S1220

FIG. 14

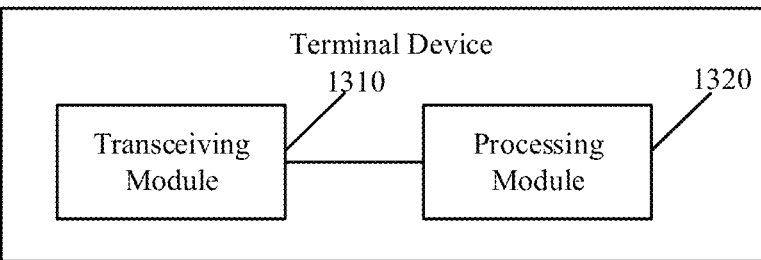

FIG. 15

METHOD FOR TIME SYNCHRONIZATION, AND TERMINAL DEVICE AND NETWORK DEVICE

CROSS-REFERENCE TO RELATED APPLICATION

This application is a continuation of International Application No. PCT/CN2021/098463, filed Jun. 4, 2021, the entire disclosure which is incorporated herein by reference.

TECHNICAL FIELD

This application relates to the technical field of communications, and in particular to a method for time synchronization, a terminal device and a network device.

BACKGROUND

In a communication system, time synchronization is required between terminal device and network device to achieve reliable data transmission. Generally, terminal devices and network devices can implement time synchronization by performing propagation delay compensation operation. However, based on current communication standards, it is up to the terminal devices to decide whether to perform the propagation delay compensation operation, which cannot guarantee the time synchronization accuracy requirements of different service scenarios, resulting in the inability to meet the reliability requirements of data transmission in different service scenarios.

SUMMARY

Embodiments of this application provide a method for time synchronization, a terminal device and a network device, which can determine the propagation delay compensation mode to be used based on the signaling interaction between the terminal device and the network device, thereby ensuring the accuracy requirements of time synchronization in different service scenarios, so as to meet the reliability requirement of data transmission in different service scenarios.

According to a first aspect, embodiments of this application provide a method for time synchronization, which is applied to a terminal device and includes:

sending first information to a network device, where the first information is configured to indicate a propagation delay compensation mode supported by the terminal device;

receiving second information from the network device; and performing propagation delay compensation according to a target propagation delay compensation mode related to the second information;

where the target propagation delay compensation mode is one of the propagation delay compensation mode supported by the terminal device, or the target propagation delay compensation mode is a propagation delay compensation mode autonomously determined by the terminal device.

According to a second aspect, embodiments of this application provide a method for time synchronization, which is applied to a network device and includes:

receiving first information from a terminal device, where the first information is configured to indicate a propagation delay compensation mode supported by the terminal device; and sending second information to the terminal device, where the second information is used by the terminal device to perform propagation delay compensation according to a target propagation delay compensation mode related to the second information;

where the target propagation delay compensation mode is one of the propagation delay compensation mode supported by the terminal device, or the target propagation delay compensation mode is a propagation delay compensation mode autonomously determined by the terminal device.

According to a third aspect, embodiments of this application provide a terminal device, including:

a transceiving module, configured to send first information to a network device, where the first information is configured to indicate a propagation delay compensation mode supported by the terminal device;

the transceiving module is further configured to receive second information from the network device; and a processing module, configured to perform propagation delay compensation according to a target propagation delay compensation mode related to the second information;

where the target propagation delay compensation mode is one of the propagation delay compensation mode supported by the terminal device, or the target propagation delay compensation mode is a propagation delay compensation mode autonomously determined by the terminal device.

According to a fourth aspect, embodiments of this application provide a network device, including:

a receiving module, configured to receive first information from a terminal device, where the first information is configured to indicate a propagation delay compensation mode supported by the terminal device; and a sending module, configured to send second information to the terminal device, where the second information is used by the terminal device to perform propagation delay compensation according to a target propagation delay compensation mode related to the second information;

where the target propagation delay compensation mode is one of the propagation delay compensation mode supported by the terminal device, or the target propagation delay compensation mode is a propagation delay compensation mode autonomously determined by the terminal device.

According to a fifth aspect, embodiments of this application provide a terminal device, characterized in including a processor, a memory, a communication interface, and one or more programs, where the one or more programs are stored in the memory, and the processor, through executing the one or more programs, causes the terminal device to implement the method for time synchronization described in the first aspect.

According to a sixth aspect, embodiments of this application provide a network device, including a processor, a memory, a communication interface, and one or more programs, where the one or more programs are stored in the memory, and the processor, through executing the one or more programs, causes the terminal device to implement the method for time synchronization described in the second aspect.

According to a seventh aspect, embodiments of this application provide a communication system, including the terminal device and/or the network device as described above. In some other embodiments, the system may further include other devices that interact with the terminal device or the network device according to some embodiments of this application.

According to an eighth aspect, embodiments of this application provide a computer-readable storage medium with a computer program stored thereon, where the computer program causes a terminal device to implement part or all of steps as described in the method for time synchronization according to the first aspect of embodiments of this application.

According to a ninth aspect, embodiments of this application provide a computer-readable storage medium with a computer program stored thereon, where the computer program causes a terminal device to implement part or all of steps as described in the method for time synchronization according to the second aspect of embodiments of this application.

According to a tenth aspect, embodiments of this application provide a computer program product, including a non-transitory computer-readable storage medium storing a computer program, where the computer program is operable to cause a terminal device to implement part or all of steps as described in the method for time synchronization according to the first aspect of embodiments of this application. The computer program product may be a software installation package.

According to an eleventh aspect, embodiments of this application provide a computer program product, including a non-transitory computer-readable storage medium storing a computer program, where the computer program is operable to cause a terminal device to implement part or all of steps as described in the method for time synchronization according to the second aspect of embodiments of this application. The computer program product may be a software installation package.

According to a twelfth aspect, embodiments of this application provide a chip, including a memory and a processor, where the processor can call and run a computer program from the memory, so as to implement part or all of steps as described in the method for time synchronization according to the first or second aspect.

Based on the solution provided by embodiments of this application, the terminal device sends to the network device the information indicating the propagation delay compensation mode supported by the terminal device and, after receiving the second information sent by the network device, performing the propagation delay compensation according to the target propagation delay compensation mode related to the second information, where the target propagation delay compensation mode related to the second information is one of the propagation delay compensation modes supported by the terminal device or a propagation delay compensation mode autonomously determined by the terminal device. Through the signaling interaction between the terminal device and the network device, the terminal device can determine the propagation delay compensation mode to be used according to the information sent by the network device, and perform propagation delay compensation according to the propagation delay compensation mode, thereby ensuring the accuracy requirements of time synchronization in different service scenarios, so as to meet the reliability requirement of data transmission in different service scenarios.

BRIEF DESCRIPTION OF THE DRAWINGS

In order to more clearly illustrate the technical solutions in the embodiments of this application, the drawings that need to be used in the description of the embodiments will be briefly introduced below. Obviously, the drawings in the following description are only some embodiments of this application. For those skilled in the art, other drawings can also be obtained based on these drawings without creative effort.

FIG. 5 is another schematic flowchart of a method for time synchronization according to some embodiments of this application.

FIG. 6 is a schematic flowchart of an example of the method for time synchronization according to some embodiments of this application.

FIG. 13 is a schematic flowchart of another example of the method for time synchronization according to some embodiments of this application.

FIG. 14 is a schematic flowchart of a method for time synchronization according to some other embodiments of this application.

FIG. 15 is a schematic structural diagram of a terminal device according to some embodiments of this application.

DETAILED DESCRIPTION

In order to make the purpose, technical solution and advantages of this application clearer, the implementation manners of this application will be further described in detail below in conjunction with the accompanying drawings.

It can be understood that the technical solution of this application can be specifically applied to Time Sensitive Network (TSN) system, Time Sensitive Communication (TSC) system, the 5th Generation (5G) system, which may also be called New Radio (NR) system, Long Term Evolution (LTE) system, or the like.

Figure 1:
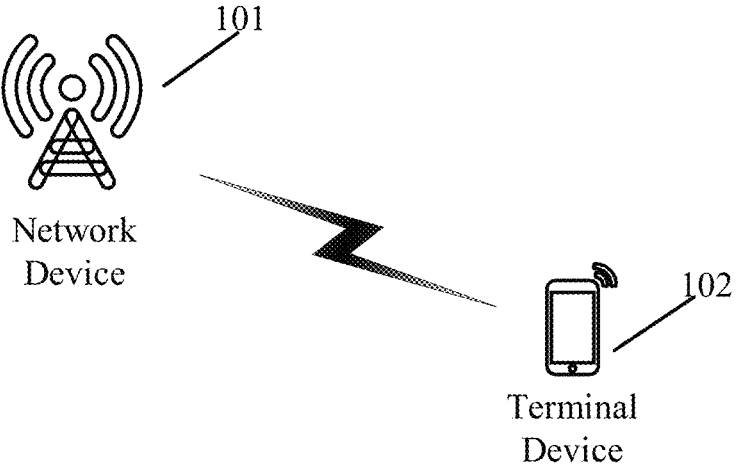
FIG. 1 is an architecture diagram of a communication system according to some embodiments of this application.

Referring to FIG. 1, which is an architecture diagram of a communication system according to this application. As shown in FIG. 1, the communication system may include: one or more network devices 101, and one or more terminal devices 102. FIG. 1 only shows one network device 101 and one terminal device 102 as an example. Data transmission can be performed between the network device 101 and the terminal device 102. In order to ensure the reliability of data transmission, time synchronization between the terminal device 102 and the network device 101 needs to be performed.

Figure 2:
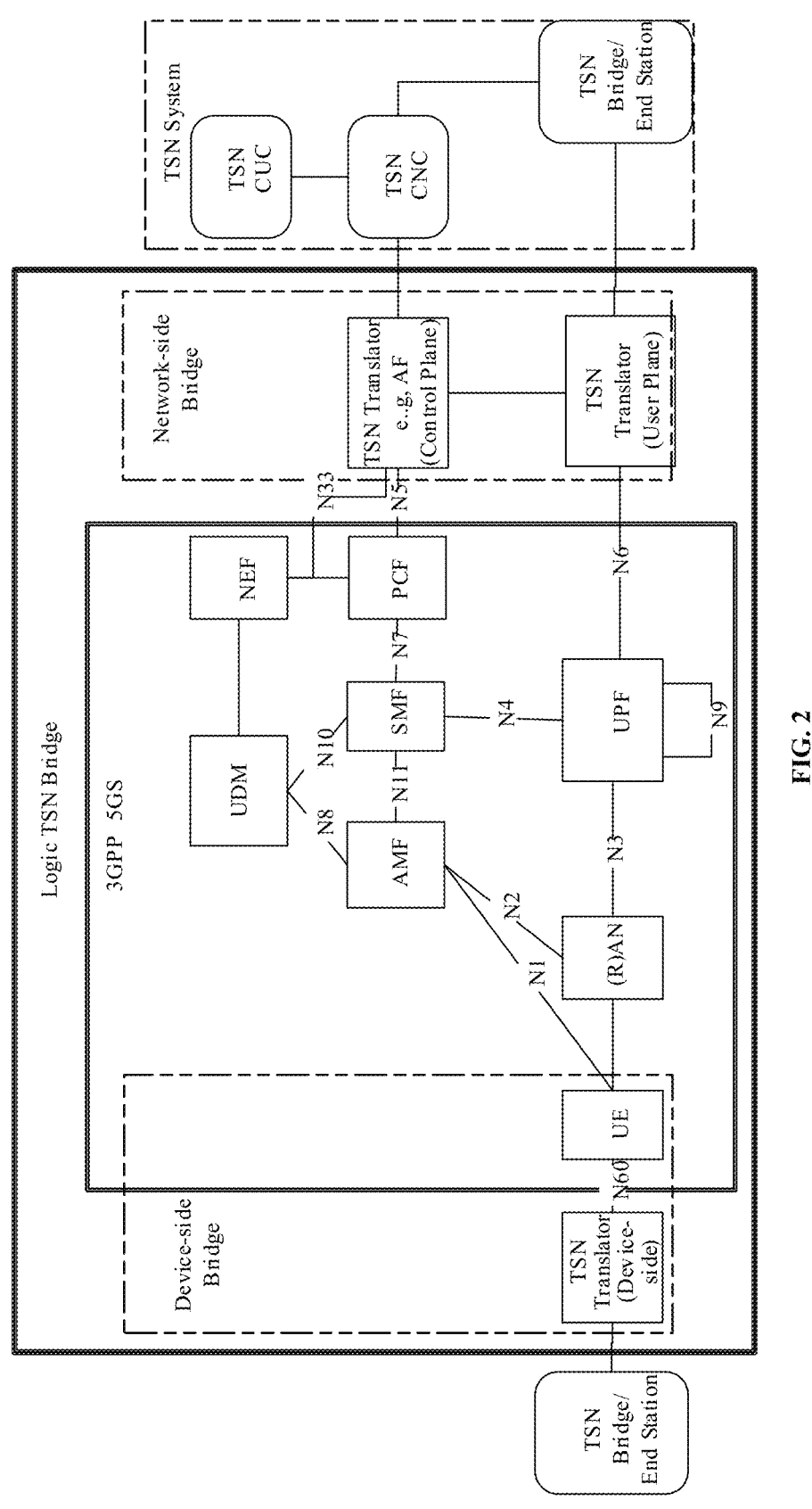
FIG. 2 is a system architecture diagram of a time-sensitive network (TSN) according to some embodiments of this application.

In some scenarios, such as for TSN or TSC system, or for some services requiring high synchronization accuracy, or for some services requiring low latency, etc., it is necessary to ensure the time synchronization accuracy of different systems or service scenarios, so as to meet requirement of data transmission. Taking the TSN system as an example, referring to FIG. 2, it is an architecture diagram of a TSN system according to some embodiments of this application. As shown in FIG. 2, the TSN system may include a TSN bridge or a TSN network bridge, a device side TSN conversion device (TSN Translator), a 5G system (5GS), a network side of bridge, and a TSN system. In some embodiments, the TSN bridge may be a terminal station, a termination station, an end station or the like. The 5GS may include a terminal device such as user equipment (UE), radio access network (RAN), access and mobility management entity (AMF), session management function (SMF), unified data management (UDM), user plane function (UPF), policy and charging function (PCF), network exposure function (NEF) and other network elements. The network side of bridge may include a control plane (CP) TSN translator such as application function (AF), and a user plane (UP) TSN translator. The TSN system may include TSN centralized user configuration (GUC), TSN centralized network configuration (CNC), TSN bridge, and the like. In some embodiments, (R)AN may include a network device such as a base station. The device side TSN translator and the UE are network elements in the device side bridge (Device side of Bridge). In the TSN network, the 5G network may be used as a TSN bridge to provide services for the TSN network and services through the 5G network.

In some embodiments of the application, the network device may be an entity on the network side for sending or receiving information, such as a base station, which may be used to communicate with one or more terminal devices, and may also be used to communicate with one or more base stations with partial functions of terminal (e.g., communication between a macro base station and a micro base station, such as communication between access points). The base station can be a base transceiver station (BTS), or an evolutional Node B (eNB) in the LTE system, a gNB in the NR system, or the like, which is not elaborated here. Alternatively, the network device 101 can also be a transmission point (TP), an access point (AP), a transmission and receiver point (TRP), a relay device, a central unit (CU), or other network devices with functions of base station, which are not limited in the embodiments of this application.

In some embodiments of this application, the terminal device is a device with a communication function, such as a vehicle-mounted device, a wearable device, a handheld device (e.g., a smart phone), and the like. The terminal device can also be called other names, such as user equipment (UE), subscriber unit, mobile station (MS), mobile unit (MU), and the like, which are not limited in the embodiments of this application.

In some embodiments of this application, time synchronization may also be referred to as synchronization, clock synchronization, or the like, which is not limited in the embodiments of this application.

It can be understood that the communication system shown in FIG. 1 or FIG. 2 is only an example and does not constitute a limitation to this application. Those skilled in the art know that with the evolution of the network architecture and the emergence of new service scenarios, the technical solution of this application is also applicable to similar technical problems.

It should be understood that in various embodiments of this application, the serial numbers of the processes do not mean the order of execution, and the execution order of the processes should be determined by their functions and internal logic, without constituting limitation on the implementation process of the embodiments of this application.

Figure 3:
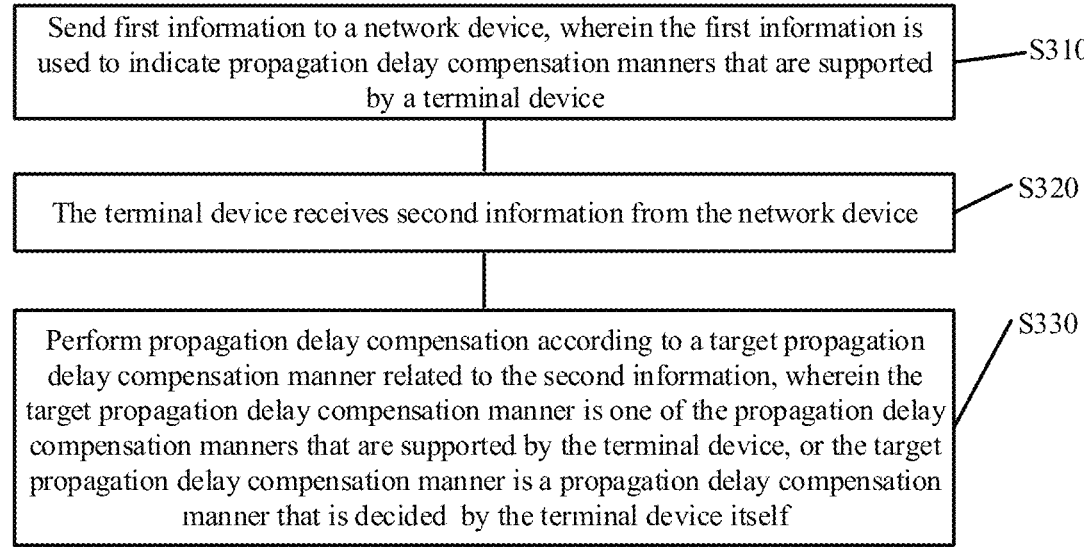
FIG. 3 is a schematic flowchart of a method for time synchronization according to some embodiments of this application.

Referring to FIG. 3. it is a schematic flowchart of a method for time synchronization according to some embodiments of this application. The method for time synchronization in some embodiments can be applied to the above-mentioned communication system, and can be specifically applied to the above-mentioned terminal device. As shown in FIG. 3, the method includes following content.

In S310, first information is sent to the network device, where the first information is used to indicate a propagation delay compensation mode supported by the terminal device.

Optionally, in some embodiments, the terminal device may send capability information to the network device, and report the propagation delay compensation mode supported by itself to the network device through the capability information.

In some embodiments of this application, the propagation delay compensation mode supported by the terminal device may include one propagation delay compensation mode, or may include multiple propagation delay compensation modes. For example, the propagation delay compensation mode supported by the terminal device includes at least one of a first propagation delay compensation mode and a second propagation delay compensation mode. Here, the first propagation delay compensation mode is a time advance-based (TA-based) delay compensation mode, and the second propagation delay compensation mode is a round-trip time-based (RTT-based) delay compensation mode.

Taking the TA-based delay compensation mode and the RTT-based delay compensation mode described above as examples, capabilities of terminal devices may be divided into three types. Terminal devices with capability 1 may only support the TA-based delay compensation mode, terminal devices with capability 2 may only support the RTT-based delay compensation mode, and terminal devices with capability 3 may support both the TA-based and RTT-based delay compensation modes. A terminal device may indicate the capability of the terminal device through the value of an information field in the capability information, and further indicate the delay compensation mode supported by the terminal device.

In S320, the terminal device receives second information from the network device.

It can be understood that the second information is determined by the network device based on the first information sent by the terminal device.

In S330, propagation delay compensation is performed according to a target propagation delay compensation mode related to the second information. The target propagation delay compensation mode is one of the propagation delay compensation modes supported by the terminal device, or the target propagation delay compensation mode is a propagation delay compensation mode autonomously determined by the terminal device.

It should be noted that in S330, when referring to that the terminal device autonomously determines the propagation delay compensation mode, it can be understood as that the terminal device autonomously implements the propagation delay compensation process, and the terminal device may or may not perform the propagation delay compensation. Alternatively, it can be understood as that the propagation delay compensation process defined by the current communication standard version is not performed and, instead, the terminal device autonomously implements the propagation delay compensation process, and the terminal device may or may not perform propagation delay compensation.

According to the method for time synchronization in some embodiments of this application, the terminal device sends to the network device the information indicating the propagation delay compensation mode supported by the terminal device and, after receiving the second information sent by the network device, performs the propagation delay compensation according to the target propagation delay compensation mode related to the second information, where the target propagation delay compensation mode related to the second information is one of the propagation delay compensation modes supported by the terminal device or a propagation delay compensation mode autonomously determined by the terminal device. Through the signaling interaction between the terminal device and the network device, the terminal device can determine the propagation delay compensation mode to be used according to the information sent by the network device, and perform propagation delay compensation according to the propagation delay compensation mode, thereby ensuring the accuracy requirements of time synchronization in different service scenarios, so as to meet the reliability requirement of data transmission in different service scenarios.

It can be understood that, in the method for time synchronization shown in FIG. 3, the terminal device performs the propagation delay compensation process. If the propagation delay compensation process is to be performed by the network device, the network device performs the propagation delay compensation according to the target propagation delay compensation mode, so as to realize time synchronization between the terminal device and the network device.

Figure 4:
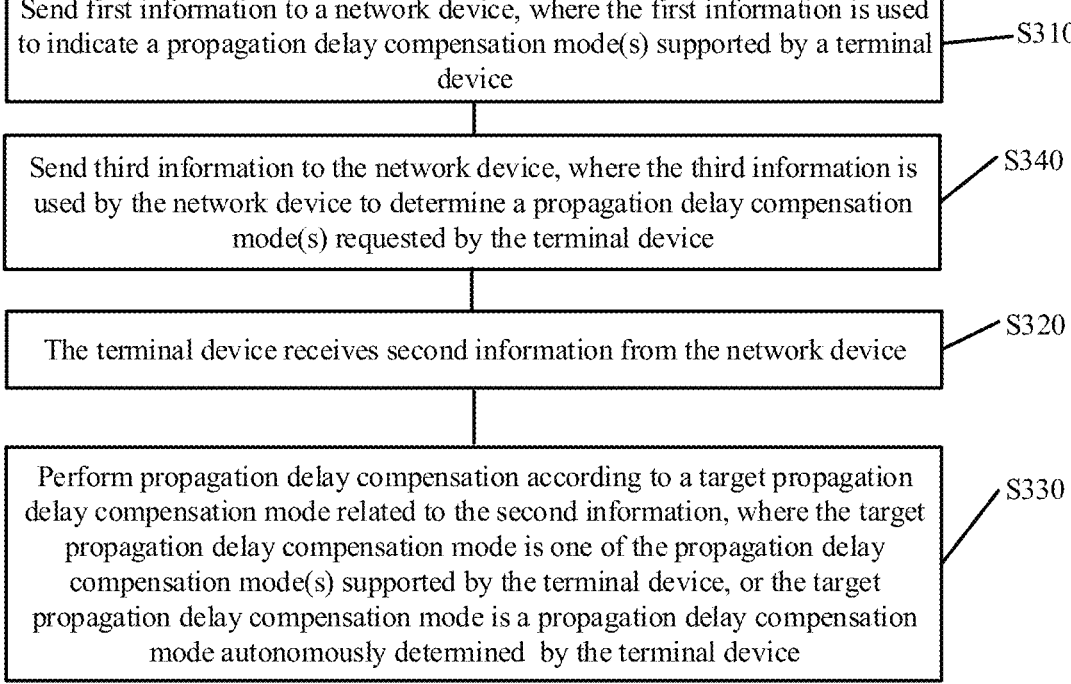
FIG. 4 is another schematic flowchart of a method for time synchronization according to some embodiments of this application.

In some embodiments of this application, the target propagation delay compensation mode in S330 is one of propagation delay compensation modes requested by the terminal device among the propagation delay compensation modes supported by the terminal device. Under the circumstances, as shown in FIG. 4, before S320, the method shown in FIG. 3 also includes following content.

In S340, third information is sent to the network device, where the third information is used by the network device to determine the propagation delay compensation mode(s) requested by the terminal device.

In other words, after the terminal device sends to the network device the information indicating the propagation delay compensation modes supported by the terminal device, and before receiving the second information sent by the network device, the terminal device notifies the network device, by sending the third information to the network device, the propagation delay compensation mode(s) requested by the terminal device. On the basis of obtaining the propagation delay compensation modes supported by the terminal device and the propagation delay compensation mode(s) requested by the terminal device, the network device can determine a more appropriate delay compensation mode for the current service scenario based on such information, thereby ensuring the accuracy requirements of time synchronization in different service scenarios, so as to meet the reliability requirement of data transmission in different service scenarios.

For example, the terminal device supports the TA-based delay compensation mode and the RTT-based delay compensation mode, and the terminal device informs the network device that the terminal device requests to use the TA-based delay compensation mode through the third information, or informs the network device that the terminal device requests to use the RTT-based delay compensation mode.

Further, the third information indicates the target propagation delay compensation mode. In other words, the propagation delay compensation mode(s) requested by the terminal device is the propagation delay compensation mode(s) related to the second information. In this case, the network device determines the second information based on the first information and the third information sent by the terminal device.

In some embodiments, the second information in S320 is used to trigger the terminal device to perform propagation delay compensation. Here, the example that the second information is used to trigger the terminal device to perform propagation delay compensation may also be understood as that the second information is used to instruct the terminal device to perform propagation delay compensation.

A manner in which the second information is used to trigger the terminal device to perform propagation delay compensation may be to trigger the terminal device to perform propagation delay compensation by indicating the target propagation delay compensation mode. In some embodiments, the second information includes first propagation delay compensation mode indication information, and the first propagation delay mode indication information is used to indicate the target propagation delay compensation mode.

For example, after the terminal device sends the first information to the network device, the network device sends second information to the terminal device, where the second information indicates the target propagation delay compensation mode. Alternatively, after the terminal device sends the first information to the network device, the terminal device sends the third information to the network device; and after receiving the third information, the network device sends the second information to the terminal device, where the second information is used to indicate the target propagation delay compensation mode. After receiving the second information, the terminal device performs propagation delay compensation based on the target propagation delay compensation mode. If the second information subsequently received by the terminal device indicates the terminal device to perform propagation delay compensation by using another propagation delay compensation mode, the terminal device performs propagation delay compensation based on the propagation delay compensation mode indicated by the latest received second information.

It can be understood that if the second information only includes the first propagation delay compensation mode indication information, the second information and the first propagation delay compensation mode indication information are essentially the same piece of information.

As an example, in a scenario where half-period (or interpreted as semi-persistent (SP) or semi-static) delay compensation is adopted, the second information may be used to trigger the terminal device to perform propagation delay compensation.

The second information in S320 may include first compensation amount information, where the first compensation amount information is used by the terminal device to determine the compensation amount corresponding to the target propagation delay compensation mode.

For example, after the terminal device sends the first information to the network device, the network device sends the second information to the terminal device, and the second information triggers the terminal device to perform propagation delay compensation by using the target propagation delay compensation mode. At the same time, the second information further includes the first compensation amount information, so the terminal device determines the compensation amount corresponding to the target propagation delay compensation mode according to the first compensation amount information, and then implements propagation compensation through the target propagation delay compensation mode. Alternatively, after the terminal device sends the first information to the network device, the terminal device sends the third information to the network device. After receiving the third information, the network device sends the second information to the terminal device, and the second information is used to indicate the target propagation delay compensation mode and includes the first compensation amount information in the second information. The terminal device determines the compensation amount corresponding to the target propagation delay compensation mode according to the first compensation amount information, and then implements propagation delay compensation based on the target propagation delay compensation mode. By using one piece of information, the terminal device can determine both the target propagation delay compensation mode and the propagation delay compensation amount, thereby simplifying the implementation of the network device and the terminal device.

Optionally, the second information may not include the first compensation amount information. In this case, the network device may send other information enabling the terminal device to determine the compensation amount corresponding to the target propagation delay compensation mode according to said other information. It can be understood that the compensation amount corresponding to each propagation delay compensation period may change, so the information used for the terminal device to determine the compensation amount may be sent more frequently than the information used to indicate the target propagation delay compensation mode. When the target propagation delay compensation mode and compensation amount are indicated (explicit indication or implicit indication) through different pieces of information, signaling overhead can be reduced.

If the target propagation delay compensation mode is the TA-based delay compensation mode, the compensation amount corresponding to the target propagation delay compensation mode is an estimated TA value. If the target propagation delay compensation mode is the RTT-based delay compensation mode, the compensation amount corresponding to the target propagation delay compensation mode is a measured RTT value. It can be understood that if the propagation delay compensation is performed by the network device, the second information does not include the first compensation amount information, the terminal device sends the measured RTT value to the network device after receiving the second information, and the network device performs propagation delay compensation based on the measured RTT value sent by the terminal device.

In some embodiments of this application, the second information in S320 is used to trigger the terminal device to perform propagation delay compensation. In this case, as shown in FIG. 5, after S320, the method shown in FIG. 3 further includes following content.

In S350, fourth information is received from the network device, where the fourth information includes second propagation delay compensation mode indication information, and the second propagation delay compensation mode indication information is used to indicate the target propagation delay compensation mode.

In other words, if the second information is only used to trigger the terminal device to perform propagation delay compensation, the network device may indicate the target propagation delay compensation mode by sending the fourth information to the terminal device.

Further, the fourth information may further include second compensation amount information, and the second compensation amount information is used by the terminal device to determine the compensation amount corresponding to the target propagation delay compensation mode. By using one piece of information, the terminal device can determine both the target propagation delay compensation mode and the propagation delay compensation amount, thereby simplifying the implementation of the network device and the terminal device.

Optionally, the fourth information may not include the second compensation amount information. In this case, the network device may send other information enabling the terminal device to determine the compensation amount corresponding to the target propagation delay compensation mode according to said other information. It can be understood that the compensation amount corresponding to each propagation delay compensation period may change, so the information used for the terminal device to determine the compensation amount may be sent more frequently than the information used to indicate the target propagation delay compensation mode. When the target propagation delay compensation mode and compensation amount are indicated (explicit indication or implicit indication) through different pieces of information, signaling overhead can be reduced.

On the basis of the embodiments shown in FIG. 3 to FIG. 5 above, before S320, the method for time synchronization in some embodiments of this application further includes following content.

The fifth information from is received the network device, where the fifth information is used to configure an available propagation delay compensation mode(s) of the terminal device, and the available propagation delay compensation mode(s) includes the target propagation delay compensation mode.

Specifically, after the terminal device sends to the network device the first information indicating the propagation delay compensation mode(s) supported by the terminal device, the network device determines an available propagation delay compensation mode of the terminal device based on the first information, and configures for the terminal device the available propagation delay compensation mode of the terminal device. Alternatively, after the terminal device sends to the network device the first information indicating the propagation delay compensation mode(s) supported by the terminal device, the terminal device sends to the network device third information for the network device to determine the propagation delay compensation mode(s) requested by the terminal device, so that the network device determines an available propagation delay compensation mode of the terminal device based on the first information and the third information, and configures for the terminal device the available propagation delay compensation mode of the terminal device. The available propagation delay compensation mode of the terminal device is determined by the network device based on the capability of the terminal device or based on the capability and request of the terminal device, thereby ensuring the accuracy requirements of time synchronization in different service scenarios, so as to meet the reliability requirement of data transmission in different service scenarios.

For example, the terminal device supports the TA-based delay compensation mode and the RTT-based delay compensation mode. If the terminal device requests to use the TA-based delay compensation mode, the network device configures the available propagation delay compensation mode of the terminal device as the TA-based delay compensation mode. If the terminal device requests to use the RTT-based delay compensation mode, the network device configures the available propagation delay compensation mode of the terminal device as the RTT-based delay compensation mode. If the terminal device has no information for the network device to determine the propagation delay compensation mode requested by the terminal device, the network device may configure the terminal device to use the TA-based delay compensation mode or the RTT-based delay compensation mode based on its own implementation.

It can be understood that, the available propagation delay compensation mode of the terminal device configured by the network device may be one or more, and if the available propagation delay compensation mode configured by the network device is more than one, the network device may indicate through other information the target propagation delay compensation mode, for example, indicate the target propagation delay compensation mode through the above-mentioned second information.

Further, the fifth information above further includes at least one item of propagation delay compensation period information and time offset information. Here, the propagation delay compensation period information is used for the terminal device to determine the time interval (period/cycle) for performing propagation delay compensation, and the time offset information is used for the terminal device to determine the time (which can be understood as a time point) for performing propagation delay compensation. For example, if the propagation delay compensation period information indicates that the time interval for performing propagation delay compensation is 20 ms and the time offset is 5 ms, the terminal device performs propagation delay compensation every 20 ms, and the time to perform propagation delay compensation is 5 ms after the beginning of every period of 20 ms.

In some embodiments of this application, the second information in S320 is used to configure the available propagation delay compensation mode(s) of the terminal device, where the available propagation delay compensation mode(s) includes the target propagation delay compensation mode.

Specifically, after the terminal device sends the first information to the network device, the network device sends second information to the terminal device, and the second information configures the available propagation delay compensation mode(s) of the terminal device. Alternatively, after sending the first information to the network device, the terminal device sends to the network device third information for the network device to determine the propagation delay compensation mode(s) requested by the terminal device, and then the network device sends the second information to the terminal device, so as to configure the available propagation delay compensation mode(s) for the terminal device through the second information.

It can be understood that, the available propagation delay compensation mode(s) of the terminal device configured by the network device through the second information may be one or more, and if the network device configures multiple available propagation delay compensation modes, the network device may indicate the target propagation delay compensation mode through other information.

Further, when the second information is used to configure the available propagation delay compensation mode(s) of the terminal device, the second information may further include at least one item of propagation delay compensation period information and time offset information. Here, the propagation delay compensation period information is used for the terminal device to determine the time interval (period/cycle) for performing propagation delay compensation, and the time offset information is used for the terminal device to determine the time (which can be understood as a time point) for performing propagation delay compensation. For example, if the propagation delay compensation period information indicates that the time interval for performing propagation delay compensation is 20 ms and the time offset is 5 ms, the terminal device performs propagation delay compensation every 20 ms, and the time to perform propagation delay compensation is 5 ms after the beginning of every period of 20 ms.

Optionally, when the second information is used to configure the available propagation delay compensation mode(s) of the terminal device, the target propagation delay compensation mode is one of the propagation delay compensation modes supported by the terminal device, and the second information is used for configuring an available propagation delay compensation mode as the target propagation delay compensation mode. In other words, the network device may configure the target propagation delay compensation mode used by the terminal device to perform propagation delay compensation through the second information.

For example, the target propagation delay compensation mode is the TA-based delay compensation mode, the terminal device indicates through the first information that the propagation delay compensation mode supported by the terminal device includes the TA-based delay compensation mode, and the network device configures, through the second information, the terminal device to perform propagation delay compensation by using the TA-based delay compensation mode. For another example, the terminal device indicates through the first information that the propagation delay compensation modes supported by the terminal device include the TA-based delay compensation mode and the RTT-based delay compensation mode, and the network device configures, through the second information, the terminal device to perform propagation delay compensation by using the RTT-based time delay compensation mode. Alternatively, as another example, the terminal device indicates through the first information that the propagation delay compensation modes supported by the terminal device include the TA-based delay compensation mode and the RTT-based delay compensation mode, and indicates through the third information that the propagation delay compensation mode requested by the terminal device to use is the RTT-based delay compensation mode, then the network device configures, through the second information, the terminal device to perform propagation delay compensation by using the RTT-based delay compensation mode.

In some embodiments of this application, when the second information in S320 is used to configure the available propagation delay compensation mode(s) of the terminal device, the method for time synchronization shown in FIG. 3 further includes:

receiving sixth information from the network device, where the sixth information is used to trigger the terminal device to perform delay compensation by using the target propagation delay compensation mode.

For example, after receiving the second information configuring the available propagation delay compensation mode(s), the terminal device does not immediately perform propagation delay compensation, but starts to perform propagation delay compensation according to configuration of the second information after the network device triggers the terminal device to perform propagation delay compensation.

It can be understood that, when the available propagation delay compensation mode(s) of the terminal device configured by the second information includes at least two propagation delay compensation modes, the sixth information may indicate one of the at least two propagation delay compensation modes as the target propagation delay compensation mode, and trigger the terminal device to perform propagation delay compensation by using the target propagation delay compensation mode.

Further, the sixth information may include information for the terminal device to determine the compensation amount corresponding to the target propagation delay compensation mode. Alternatively, if the sixth information does not include the information for the terminal device to determine target propagation delay compensation amount, the network device sends other information to the terminal device, thereby enabling the terminal device to determine the compensation amount corresponding to the target propagation delay compensation mode according to the other information. For example, the network device may send eighth information to the terminal device, where the eighth information is used by the terminal device to determine the compensation amount corresponding to the target propagation delay compensation mode. The signaling overhead can be reduced by using different information to indicate the target propagation delay compensation mode and compensation amount (explicit indication or implicit indication).

In some embodiments of this application, when the second information in S320 is used to configure the available propagation delay compensation mode(s) of the terminal device, the method for time synchronization shown in FIG. 3 further includes:

receiving seventh information from the network device, where the seventh information is used to indicate the target propagation delay compensation mode.

For example, after the network device configures the available propagation delay compensation mode(s) of the terminal device through the second information, it may indicate one of the available propagation delay compensation mode(s) as the target propagation delay compensation mode through the seventh information, so that the terminal device performs propagation delay compensation by using the propagation delay compensation mode indicated by the seven information.

Further, the seventh information may include information for the terminal device to determine the compensation amount corresponding to the target propagation delay compensation mode. Alternatively, if the seventh information does not include the information for the terminal device to determine target propagation delay compensation amount, the network device sends other information to the terminal device, thereby enabling the terminal device to determine the compensation amount corresponding to the target propagation delay compensation mode according to the other information. For example, the network device may send eighth information to the terminal device, where the eighth information is used by the terminal device to determine the compensation amount corresponding to the target propagation delay compensation mode. The signaling overhead can be reduced by using different information to indicate the target propagation delay compensation mode and compensation amount (explicit indication or implicit indication).

The method for time synchronization in some embodiments of this application will be described below with reference to specific examples. FIG. 6 is an example of the method for time synchronization according to some embodiments of this application. As shown in FIG. 6, the method for time synchronization includes following content.

In S410, the terminal device sends capability information to the network device.

In S410, the terminal device informs, through capability information, the network device of the propagation delay compensation mode(s) supported by the terminal device. It can be understood that the capability information in S410 is the same as the above first information used to indicate the propagation delay compensation mode(s) supported by the terminal device.

In S420, the network device sends first indication information to the terminal device.

In S420, the network device indicates the target propagation delay compensation mode through the first indication information and triggers the terminal device to perform propagation delay compensation.

It can be understood that the first indication information in S420 is essentially the same as the second information in the case described above where the second information is used to trigger the terminal device to perform propagation delay compensation and/or where the second information includes the first propagation delay compensation mode indication information.

In S430, the network device sends second indication information to the terminal device.

In S430, the network device indicates to the terminal device, through the second indication information, information for the terminal device to determine the compensation amount corresponding to the target propagation delay compensation mode indicated by the first indication information.

Figure 7:
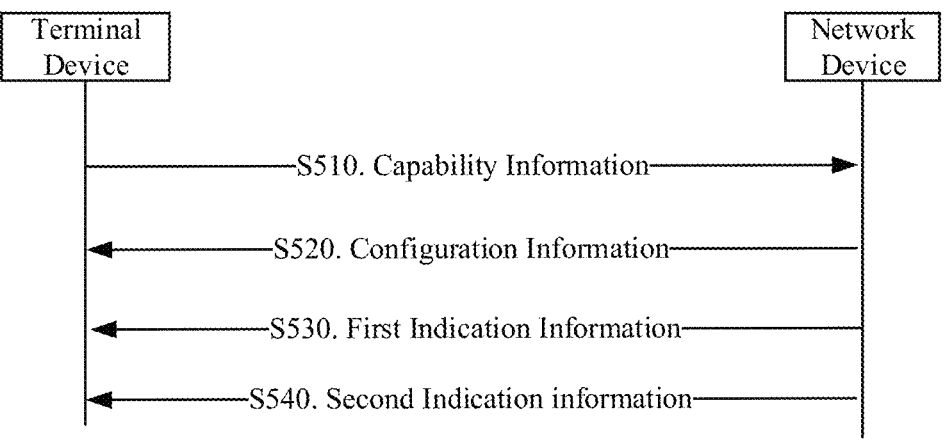
FIG. 7 is a schematic flowchart of another example of the method for time synchronization according to some embodiments of this application.

FIG. 7 shows another example of this application. As shown in FIG. 7, the method for time synchronization includes following content.

In S510, the terminal device sends capability information to the network device.

The capability information in S510 is the same as the capability information in S410.

In S520, the network device sends configuration information to the terminal device.

In S520, the network device configures the available propagation delay compensation mode(s) of the terminal device through the configuration information. It can be understood that the configuration information is the same as the second information in the case described above where the second information is used to configure the available propagation delay compensation mode(s) of the terminal device.

In S530, the network device sends first indication information to the terminal device.

The first indication information in S530 is the same as the first indication information in S420.

In S540, the network device sends second indication information to the terminal device.

In S540, the network device indicates to the terminal device, through the second indication information, information for the terminal device to determine the compensation amount corresponding to the target propagation delay compensation mode indicated by the first indication information.

Figure 8:
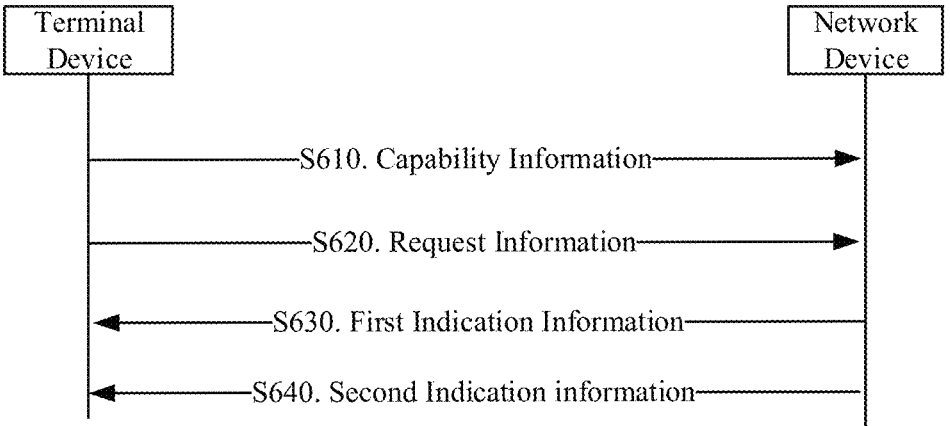
FIG. 8 is a schematic flowchart of another example of the method for time synchronization according to some embodiments of this application.

FIG. 8 shows another example of this application. As shown in FIG. 8, the method for time synchronization includes following content.

In S610, the terminal device sends capability information to the network device.

The capability information in S610 is the same as the capability information in S410.

In S620, the terminal device sends request information to the network device.

In S620, the terminal device notifies, through the request information, the network device of the propagation delay compensation mode requested for use. It can be understood that the request information in S620 is the same as the third information described above for the network device to determine the propagation delay compensation mode(s) requested by the terminal device.

In S630, the network device sends first indication information to the terminal device.

The first indication information in S630 is the same as the first indication information in S420.

In S640, the network device sends second indication information to the terminal device.

In S640, the network device indicates to the terminal device, through the second indication information, information for the terminal device to determine the compensation amount corresponding to the target propagation delay compensation mode indicated by the first indication information.

Figure 9:
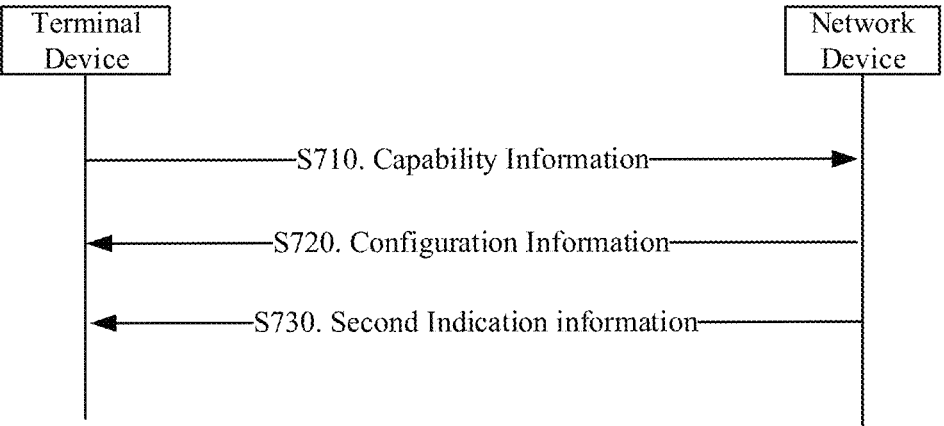
FIG. 9 is a schematic flowchart of another example of the method for time synchronization according to some embodiments of this application.

FIG. 9 shows another example of this application. As shown in FIG. 9, the method for time synchronization includes following content.

In S710, the terminal device sends capability information to the network device.

The capability information in S710 is the same as the capability information in S410.

In S720, the network device sends configuration information to the terminal device.

In S720, the network device configures, through the configuration information in S720, the target propagation delay compensation mode adopted by the terminal device to perform propagation delay compensation. Further, the configuration information may also include at least one of the propagation delay compensation period information and time offset information. The propagation delay compensation period information is used by the terminal device to determine the time interval for performing propagation delay compensation, and the time offset information is used by the terminal device to determine the time for propagation delay compensation.

In S730, the network device sends second indication information to the terminal device.

In S730, the network device indicates to the terminal device, through the second indication information, the information for the compensation amount corresponding to the target propagation delay compensation mode determined by the terminal device.

Figure 10:
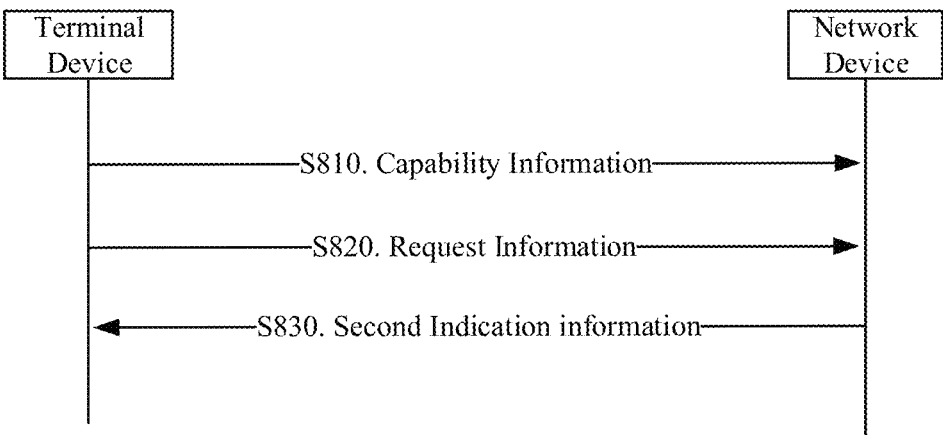
FIG. 10 is a schematic flowchart of another example of the method for time synchronization according to some embodiments of this application.

FIG. 10 shows another example of this application. As shown in FIG. 10, the method for time synchronization includes following content.

In S810, the terminal device sends capability information to the network device.

The capability information in S810 is the same as the capability information in S410.

In S820, the terminal device sends request information to the network device.

The request information in S820 is the same as the request information in S620. For example, the terminal device sends request to the network device and requests to use the TA-based delay compensation mode or the RTT-based delay compensation mode through the request information.

In S830, the network device sends second indication information to the terminal device.

In S830, the network device indicates to the terminal device, through the second indication information, the information for the compensation amount corresponding to the target propagation delay compensation mode determined by the terminal device. For example, if the terminal device sends request to the network device and requests to use the TA-based delay compensation mode or the RTT-based delay compensation mode through the request information. The network device indicates an estimated TA value or a measured RTT value through the second indication information.

Figure 11:
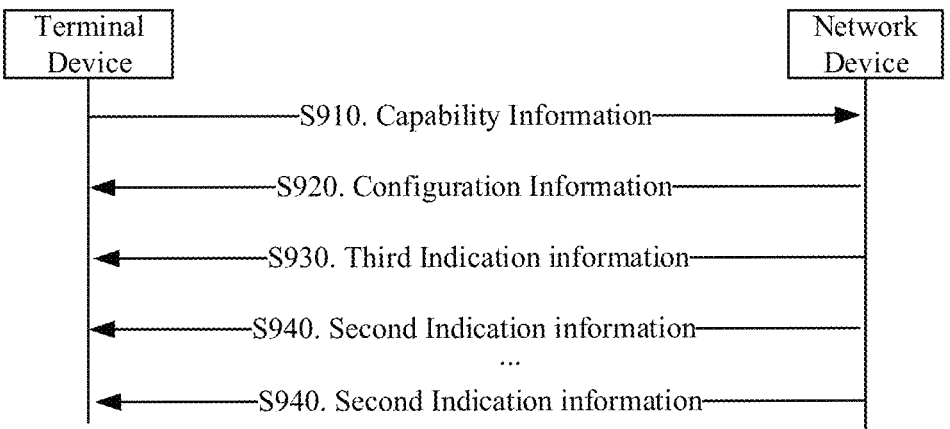
FIG. 11 is a schematic flowchart of another example of the method for time synchronization according to some embodiments of this application.

FIG. 11 is another example according to this application. As shown in FIG. 11, the method for time synchronization includes following content.

In S910, the terminal device sends capability information to the network device.

The capability information in S910 is the same as the capability information in S410.

In S920, the network device sends configuration information to the terminal device.

In S920, the network device configures the available propagation delay compensation mode(s) of the terminal device through the configuration information. For example, after the terminal device notifies the network device through capability information that the terminal device supports two propagation delay compensation modes, the network device configures the available propagation delay compensation modes of the terminal device as the two propagation delay compensation modes supported by the terminal device through the configuration information. Further, the configuration information may also include at least one item of propagation delay compensation period information and time offset information.

In S930, the network device sends third indication information to the terminal device.

In S930, the network device indicates through the third indication information that the target propagation delay compensation mode is one of the available propagation delay compensation modes configured in the configuration information. It can be understood that the difference between the third indication information in S930 and the first indication information in S420 is that, in some cases, the first indication information may only have the function of triggering the terminal device to perform propagation delay compensation without indicating a specific propagation delay compensation mode, while the third indication information only has the function of indicating a specific propagation delay compensation mode without the triggering function.

As an example, in S930, the network device may first send the first indication information in S420 to the terminal device, triggering the terminal device to perform propagation delay compensation, and then send the third indication information to the terminal device, indicating a specific propagation delay compensation mode through the third indication information.

In S940, the network device sends second indication information to the terminal device.

In S940, the network device indicates to the terminal device, through the second indication information, the information for the compensation amount corresponding to the target propagation delay compensation mode determined by the terminal device. For example, if the target propagation delay compensation mode indicated by the third indication information is the TA-based delay compensation mode or the RTT-based delay compensation mode. The network device indicates an estimated TA value or a measured RTT value through the second indication information.

It should be noted that, in the case of periodic propagation delay compensation, the compensation amount in each period may change, so the network device may send multiple pieces of second indication information to the terminal device in S940, thereby informing the terminal device of the compensation amount corresponding to each period.

Figure 12:
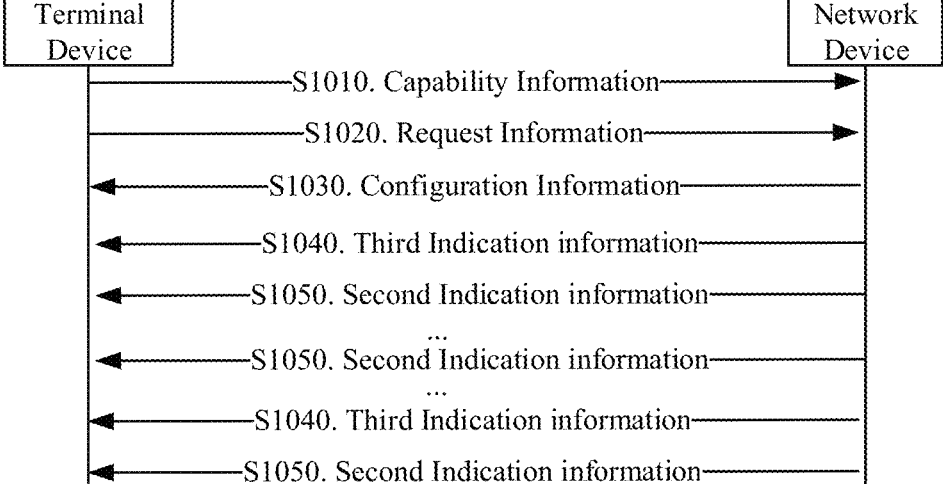
FIG. 12 is a schematic flowchart of another example of the method for time synchronization according to some embodiments of this application.

FIG. 12 is another example according to this application. As shown in FIG. 12, the method for time synchronization includes following content.

In S1010, the terminal device sends capability information to the network device.

The capability information in S1010 is the same as the capability information in S410.

In S1020, the terminal device sends request information to the network device.

The request information in S1020 is the same as the request information in S620. For example, the terminal device sends request to the network device and requests to use the TA-based delay compensation mode or the RTT-based delay compensation mode through the request information.

S1030, the network device sends configuration information to the terminal device.

In S1030, the network device configures the available propagation delay compensation mode(s) of the terminal device through the configuration information. For example, after the terminal device notifies the network device through capability information that the terminal device supports two propagation delay compensation modes, the network device configures the available propagation delay compensation modes of the terminal device as the two propagation delay compensation modes supported by the terminal device through the configuration information. Further, the configuration information may also include at least one item of propagation delay compensation period information and time offset information.

In S1040, the network device sends third indication information to the terminal device.

The third indication information in S1040 is the same as the third indication information in S930.

In S1050, the network device sends second indication information to the terminal device.

The second indication information in S1050 is the same as the second indication information in S940.

It should be noted that, in the case of periodic propagation delay compensation, the compensation amount in each period may change, so the network device may send multiple pieces of second indication information to the terminal device in S1050, thereby informing the terminal device of the compensation amount corresponding to each period.

Further, if the network device determines under certain circumstances that the target propagation delay compensation mode needs to be replaced, the network device sends the third indication information to the terminal device again, and then sends the second indication information to the terminal device. Therefore, as shown in FIG. 12, the network device may send the third indication information and the second indication information to the terminal device multiple times.

FIG. 13 is another example according to this application. As shown in FIG. 13, the method for time synchronization includes following content.

In S1110, the terminal device sends capability information to the network device.

The capability information in S1110 is the same as the capability information in S410.

In S1120, the terminal device sends request information to the network device.

The request information in S1120 is the same as the request information in S620. For example, the terminal device sends request to the network device and requests to use the TA-based delay compensation mode or the RTT-based delay compensation mode through the request information.

In S1130, the network device sends third indication information to the terminal device.

The third indication information in S1130 is the same as the third indication information in S930.

In S1140, the network device sends second indication information to the terminal device.

The second indication information in S1140 is the same as the second indication information in S940.

It should be noted that, if the network device determines under certain circumstances that the target propagation delay compensation mode needs to be replaced, the network device sends the third indication information to the terminal device again, and then sends the second indication information to the terminal device. Therefore, as shown in FIG. 13, the network device may send the third indication information and the second indication information to the terminal device multiple times.

It can be understood that, in the examples shown in FIG. 6 to FIG. 13, if the network device performs propagation delay compensation, the second indication information in these examples may be sent by the terminal device to the network device. For example, if the target propagation delay compensation mode is the RTT-based propagation delay compensation mode, and the network device performs propagation delay compensation, then the terminal device sends to the network device the second indication information indicating the measured RTT value, thereby enabling the network device to perform propagation delay compensation based on the measured RTT value as received.

The method for time synchronization in some embodiments of this application is mainly described above from the perspective of the terminal device in conjunction with the accompanying drawings, and the method for time synchronization in some embodiments of this application is described below from the perspective of the network device in conjunction with other drawings. It can be understood that the description of the interaction between the network device and the terminal device from the side of the network device is the same as the description of the interaction between the terminal device and the network device from the side of the terminal device. To avoid repetition, related descriptions are appropriately omitted.

FIG. 14 is a schematic flowchart of another method for time synchronization according to some embodiments of this application. The method for time synchronization shown in FIG. 14 can be applied to the above-mentioned communication system, and can be specifically applied to the above-mentioned network device. As shown in FIG. 14, the method includes following content.

In S1210, first information is received from a terminal device, where the first information is configured to indicate a propagation delay compensation mode supported by the terminal device.

In S1220, second information is sent to the terminal device, where the second information is used by the terminal device to perform propagation delay compensation according to a target propagation delay compensation mode related to the second information.

Herein, the target propagation delay compensation mode is one of the propagation delay compensation mode(s) supported by the terminal device, or the target propagation delay compensation mode is a propagation delay compensation mode autonomously determined by the terminal device.

According to the method for time synchronization in some embodiments of this application, after receiving the information indicating the propagation delay compensation mode supported by the terminal device, the network device sends the second information to the terminal device, so that the terminal device can perform propagation delay compensation according to the target propagation delay compensation mode related to the second information. Through the signaling interaction between the network device and the terminal device, the terminal device can determine the propagation delay compensation mode to be used according to the information sent by the network device, and perform propagation delay compensation according to the propagation delay compensation mode, thereby ensuring the accuracy requirements of time synchronization in different service scenarios, so as to meet the reliability requirement of data transmission in different service scenarios.

In some embodiments of this application, optionally, the target propagation delay compensation mode is one of a propagation delay compensation mode(s) requested by the terminal device among the propagation delay compensation mode(s) supported by the terminal device.

Herein, before sending the second information to the terminal device, the method shown in FIG. 14 further includes:

> receiving third information from the terminal device, where the third information is used by the network device to determine the propagation delay compensation mode requested by the terminal device.

In some embodiments of this application, optionally, the third information indicates the target propagation delay compensation mode.

In some embodiments of this application, optionally, the second information is configured to trigger the terminal device to perform the propagation delay compensation.

In some embodiments of this application, optionally, the second information includes first propagation delay compensation mode indication information, and the first propagation delay compensation mode indication information is configured to indicate the target propagation delay compensation mode.

In some embodiments of this application, optionally, the second information includes first compensation amount information, and the first compensation amount information is used by the terminal device to determine a compensation amount corresponding to the target propagation delay compensation mode.

In some embodiments of this application, optionally, after sending the second information to the terminal device, the method shown in FIG. 14 further includes:

> sending fourth information to the terminal device, where the fourth information includes second propagation delay compensation mode indication information, and the second propagation delay compensation mode indication information is configured to indicate the target propagation delay compensation mode.

In some embodiments of this application, optionally, the fourth information further includes second compensation amount information, and the second compensation amount information is used by the terminal device to determine a compensation amount corresponding to the target propagation delay compensation mode.

In some embodiments of this application, optionally, before sending the second information to the terminal device, the method shown in FIG. 14 further includes:

> sending fifth information to the terminal device, where the fifth information is used for configuring an available propagation delay compensation mode of the terminal device, and the available propagation delay compensation mode includes the target propagation delay compensation mode.

It can be understood that if the terminal device informs the network device, by sending the third information to the network device, of the propagation delay compensation mode requested by the terminal device to use, on the basis of obtaining the propagation delay compensation mode(s) supported and the propagation delay compensation mode(s) requested by the terminal device, the network device can determine the available propagation delay compensation mode(s) of the terminal device. In this way, a more appropriate delay compensation mode can be determined for the current service scenario based on such information, thereby ensuring the accuracy requirements of time synchronization in different service scenarios, so as to meet the reliability requirement of data transmission in different service scenarios.

In some embodiments of this application, optionally, the fifth information further includes at least one of propagation delay compensation period information and time offset information.

In some embodiments of this application, optionally, the second information is used for configuring an available propagation delay compensation mode of the terminal device, and the available propagation delay compensation mode includes the target propagation delay compensation mode.

In some embodiments of this application, optionally, the second information further includes at least one of propagation delay compensation period information and time offset information.

In some embodiments of this application, optionally, the target propagation delay compensation mode is one of the propagation delay compensation mode supported by the terminal device, and the second information configures the available propagation delay compensation mode as the target propagation delay compensation mode.

In some embodiments of this application, optionally, the method shown in FIG. 14 further includes:

sending sixth information to the terminal device, where the sixth information is configured to trigger the terminal device to perform the propagation delay compensation by using the target propagation delay compensation mode.

In some embodiments of this application, optionally, the method shown in FIG. 14 further includes:

sending seventh information to the terminal device, where the seventh information is configured to indicate the target propagation delay compensation mode.

In some embodiments of this application, optionally, the method shown in FIG. 14 further includes:

sending eighth information to the terminal device, where the eighth information is used by the terminal device to determine a compensation amount corresponding to the target propagation delay compensation mode.

In some embodiments of this application, optionally, the propagation delay compensation mode supported by the terminal device includes at least one of a first propagation delay compensation mode and a second propagation delay compensation mode.

In some embodiments of this application, optionally, the first propagation delay compensation mode is the TA-based delay compensation mode, and the second propagation delay compensation mode is the RTT-based delay compensation mode.

The method for time synchronization according to some embodiments of this application is described above with reference to the accompanying drawings, and the terminal device and the network device according to some embodiments of this application will be described in detail below with reference to the accompanying drawings.

FIG. 15 is a schematic structural diagram of a terminal device according to some embodiments of this application. As shown in FIG. 15, the terminal device includes:

a transceiving module 1310, configured to send first information to a network device, where the first information is configured to indicate a propagation delay compensation mode supported by the terminal device;

the transceiving module 1310 is further configured to receive second information from the network device; and a processing module 1320, configured to perform propagation delay compensation according to a target propagation delay compensation mode related to the second information;

herein, the target propagation delay compensation mode is one of the propagation delay compensation mode supported by the terminal device, or the target propagation delay compensation mode is a propagation delay compensation mode autonomously determined by the terminal device.

According to the terminal device in some embodiments of this application, it sends to the network device the information indicating the propagation delay compensation mode supported by the terminal device and, after receiving the second information sent by the network device, performs the propagation delay compensation according to the target propagation delay compensation mode related to the second information, where the target propagation delay compensation mode related to the second information is one of the propagation delay compensation modes supported by the terminal device or a propagation delay compensation mode autonomously determined by the terminal device. Through the signaling interaction between the terminal device and the network device, the terminal device can determine the propagation delay compensation mode to be used according to the information sent by the network device, and perform propagation delay compensation according to the propagation delay compensation mode, thereby ensuring the accuracy requirements of time synchronization in different service scenarios, so as to meet the reliability requirement of data transmission in different service scenarios.

In some embodiments of this application, optionally, the target propagation delay compensation mode is one of a propagation delay compensation mode requested by the terminal device among the propagation delay compensation mode supported by the terminal device;

herein, before receiving the second information from the network device, the transceiving module 1310 is further configured to:

send third information to the network device, where the third information is used by the network device to determine the propagation delay compensation mode requested by the terminal device.

In some embodiments of this application, optionally, the third information indicates the target propagation delay compensation mode.

In some embodiments of this application, optionally, the second information is configured to trigger the terminal device to perform the propagation delay compensation.

In some embodiments of this application, optionally, the second information includes first propagation delay compensation mode indication information, and the first propagation delay compensation mode indication information is configured to indicate the target propagation delay compensation mode.

In some embodiments of this application, optionally, second information includes first compensation amount information, and the first compensation amount information is used by the terminal device to determine a compensation amount corresponding to the target propagation delay compensation mode.

In some embodiments of this application, optionally, after receiving the second information from the network device, the transceiving module 1310 is further configured to:

receive fourth information from the network device, where the fourth information includes second propagation delay compensation mode indication information, and the second propagation delay compensation mode indication information is configured to indicate the target propagation delay compensation mode.

In some embodiments of this application, optionally, the fourth information further includes second compensation amount information, and the second compensation amount information is used by the terminal device to determine a compensation amount corresponding to the target propagation delay compensation mode.

In some embodiments of this application, optionally, before receiving the second information from the network device, the transceiving module 1310 is further configured to:

receive fifth information from the network device, where the fifth information is used for configuring an available propagation delay compensation mode of the terminal device, and the available propagation delay compensation mode includes the target propagation delay compensation mode.

In some embodiments of this application, optionally, the fifth information further includes at least one of propagation delay compensation period information and time offset information.

In some embodiments of this application, optionally, the second information is used for configuring an available propagation delay compensation mode of the terminal device, and the available propagation delay compensation mode includes the target propagation delay compensation mode.

In some embodiments of this application, optionally, the second information further includes at least one of propagation delay compensation period information and time offset information.

In some embodiments of this application, optionally, the target propagation delay compensation mode is one of the propagation delay compensation mode supported by the terminal device, and the second information configures the available propagation delay compensation mode as the target propagation delay compensation mode.

In some embodiments of this application, optionally, the transceiving module 1310 is further configured to:

receive sixth information from the network device, where the sixth information is configured to trigger the terminal device to perform the propagation delay compensation by using the target propagation delay compensation mode.

In some embodiments of this application, optionally, the transceiving module 1310 is further configured to:

receive seventh information from the network device, where the seventh information is configured to indicate the target propagation delay compensation mode.

In some embodiments of this application, optionally, the transceiving module 1310 is further configured to:

receive eighth information from the network device, where the eighth information is used by the terminal device to determine a compensation amount corresponding to the target propagation delay compensation mode.

In some embodiments of this application, optionally, the propagation delay compensation mode supported by the terminal device includes at least one of a first propagation delay compensation mode and a second propagation delay compensation mode.

In some embodiments of this application, optionally, the first propagation delay compensation mode is the TA-based delay compensation mode, and the second propagation delay compensation mode is the RTT-based delay compensation mode.

The terminal device shown in FIG. 15 can implement the corresponding processes implemented by the terminal device in the various methods according to some embodiments of this application. For the sake of brevity, details are not repeated here.

Figure 16:
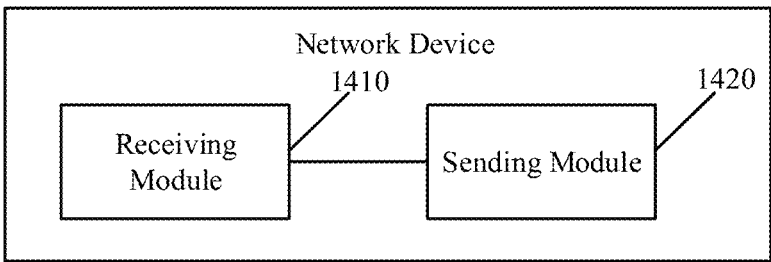
FIG. 16 is a schematic structural diagram of a network device according to some embodiments of this application.

FIG. 16 is a schematic structural diagram of a network device according to some embodiments of this application. As shown in FIG. 16, the network device includes:

a receiving module 1410, configured to receive first information from a terminal device, where the first information is configured to indicate a propagation delay compensation mode supported by the terminal device; and a sending module 1420, configured to send second information to the terminal device, where the second information is used by the terminal device to perform propagation delay compensation according to a target propagation delay compensation mode related to the second information;

herein, the target propagation delay compensation mode is one of the propagation delay compensation mode supported by the terminal device, or the target propagation delay compensation mode is a propagation delay compensation mode autonomously determined by the terminal device.

According to the network device in some embodiments of this application, after receiving the information indicating the propagation delay compensation mode supported by the terminal device, the network device sends the second information to the terminal device, so that the terminal device can perform propagation delay compensation according to the target propagation delay compensation mode related to the second information, where the target propagation delay compensation mode related to the second information is one of the propagation delay compensation mode(s) supported by the terminal device or a propagation delay compensation mode autonomously determined by the terminal device. Through the signaling interaction between the network device and the terminal device, the terminal device can determine the propagation delay compensation mode to be used according to the information sent by the network device, and perform propagation delay compensation according to the propagation delay compensation mode, thereby ensuring the accuracy requirements of time synchronization in different service scenarios, so as to meet the reliability requirement of data transmission in different service scenarios.

In some embodiments of this application, optionally, the target propagation delay compensation mode is one of a propagation delay compensation mode requested by the terminal device among the propagation delay compensation mode supported by the terminal device;

herein, before sending the second information to the terminal device, the receiving module 1410 is further configured to:

receive third information from the terminal device, where the third information is used by the network device to determine the propagation delay compensation mode requested by the terminal device.

In some embodiments of this application, optionally, the third information indicates the target propagation delay compensation mode.

In some embodiments of this application, optionally, the second information is configured to trigger the terminal device to perform the propagation delay compensation.

In some embodiments of this application, optionally, the second information includes first propagation delay compensation mode indication information, and the first propagation delay compensation mode indication information is configured to indicate the target propagation delay compensation mode.

In some embodiments of this application, optionally, the second information includes first compensation amount information, and the first compensation amount information is used by the terminal device to determine a compensation amount corresponding to the target propagation delay compensation mode.

In some embodiments of this application, optionally, after sending the second information to the terminal device, the sending module 1420 is further configured to:

send fourth information to the terminal device, where the fourth information includes second propagation delay compensation mode indication information, and the second propagation delay compensation mode indication information is configured to indicate the target propagation delay compensation mode.

In some embodiments of this application, optionally, the fourth information further includes second compensation amount information, and the second compensation amount information is used by the terminal device to determine a compensation amount corresponding to the target propagation delay compensation mode.

In some embodiments of this application, optionally, before sending the second information to the terminal device, the sending module 1420 is further configured to:

send fifth information to the terminal device, where the fifth information is used for configuring an available propagation delay compensation mode of the terminal device, and the available propagation delay compensation mode includes the target propagation delay compensation mode.

In some embodiments of this application, optionally, the fifth information further includes at least one of propagation delay compensation period information and time offset information.

In some embodiments of this application, optionally, the second information is used for configuring an available propagation delay compensation mode of the terminal device, and the available propagation delay compensation mode includes the target propagation delay compensation mode.

In some embodiments of this application, optionally, the second information further includes at least one of propagation delay compensation period information and time offset information.

In some embodiments of this application, optionally, the target propagation delay compensation mode is one of the propagation delay compensation mode supported by the terminal device, and the second information configures the available propagation delay compensation mode as the target propagation delay compensation mode.

In some embodiments of this application, optionally, the sending module 1420 is further configured to:

send sixth information to the terminal device, where the sixth information is configured to trigger the terminal device to perform the propagation delay compensation by using the target propagation delay compensation mode.

In some embodiments of this application, optionally, the sending module 1420 is further configured to:

send seventh information to the terminal device, where the seventh information is configured to indicate the target propagation delay compensation mode.

In some embodiments of this application, optionally, the sending module 1420 is further configured to:

send eighth information to the terminal device, where the eighth information is used by the terminal device to determine a compensation amount corresponding to the target propagation delay compensation mode.

In some embodiments of this application, optionally, the propagation delay compensation mode supported by the terminal device includes at least one of a first propagation delay compensation mode and a second propagation delay compensation mode.

In some embodiments of this application, optionally, the first propagation delay compensation mode is the TA-based delay compensation mode, and the second propagation delay compensation mode is the RTT-based delay compensation mode.

The network device shown in FIG. 16 can implement the corresponding processes implemented by the network device in the various methods according to some embodiments of this application. For the sake of brevity, details are not repeated here.

Figure 17:
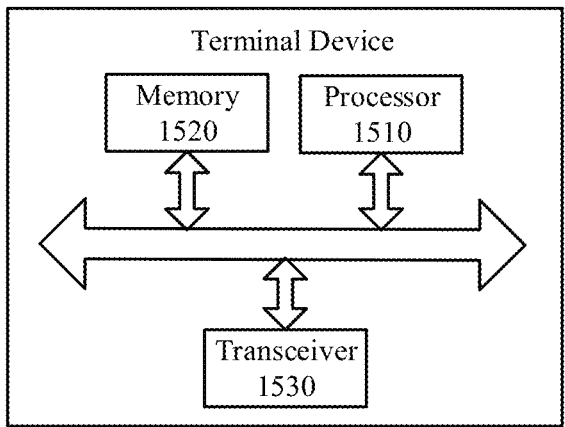
FIG. 17 is a schematic structural diagram of a terminal device according to some other embodiments of this application.

FIG. 17 is a schematic structural diagram of another terminal device according to some embodiments of this application. As shown in FIG. 17, the terminal device may include: a processor 1510, a memory 1520 and a transceiver 1530, where the processor 1510 may call and run a computer program from the memory 1520 to implement the method according to some embodiments of this application.

The memory 1520 may be an independent device independent of the processor 1510, or may be integrated in the processor 1510. The processor 1510 can control the transceiver 1530 to communicate with other devices, specifically, can send information or data to other devices, or receive information or data sent by other devices.

The transceiver 1530 may include a transmitter and a receiver, and the transceiver 1530 may further include an antenna, and the number of antennas may be one or more.

The terminal device shown in FIG. 17 can implement the corresponding processes implemented by the terminal device in the various methods according to some embodiments of this application. For the sake of brevity, details are not repeated here.

Figure 18:
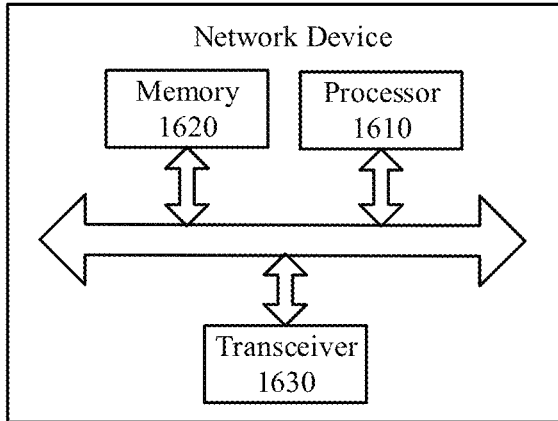
FIG. 18 is a schematic structural diagram of a network device according to some other embodiments of this application.

FIG. 18 is a schematic structural diagram of another network device according to some embodiments of this application. As shown in FIG. 18, the network device may include: a processor 1610, a memory 1620 and a transceiver 1630, where the processor 1610 may call and run a computer program from the memory 1620 to implement the method according to some embodiments of this application.

The memory 1620 may be an independent device independent of the processor 1610, or may be integrated in the processor 1610. The processor 1610 can control the transceiver 1630 to communicate with other devices, specifically, can send information or data to other devices, or receive information or data sent by other devices.

The transceiver 1630 may include a transmitter and a receiver, and the transceiver 1630 may further include an antenna, and the number of antennas may be one or more.

The network device shown in FIG. 18 can implement the corresponding processes implemented by the network device in the various methods according to some embodiments of this application. For the sake of brevity, details are not repeated here.

It should be understood that the processor in the embodiments of this application may be an integrated circuit chip, which has a signal processing capability. In the implementation process, each step of the above-mentioned method embodiments may be completed by an integrated logic circuit of hardware in a processor or instructions in the form of software. The above-mentioned processor can be a general-purpose processor, a digital signal processor (DSP), an application specific integrated circuit (ASIC), a field programmable gate array (FPGA) or other available programmable logic devices, discrete gate or transistor logic devices, discrete hardware components. Various methods, steps, and logic block diagrams disclosed in the embodiments of this application may be implemented or executed. The general-purpose processor may be a microprocessor, or may be any conventional processor, or the like. The steps of the method disclosed in connection with the embodiments of this application may be directly implemented by a hardware decoding processor, or implemented by a combination of hardware and software modules in the decoding processor. The software module can be located in a mature storage medium in the art such as random access memory, flash memory, read-only memory, programmable read-only memory, electrically erasable programmable memory, register or the like. The storage medium is located in the memory, and the processor reads the information from the memory, and completes the steps of the above method in combination with its hardware.

It can be understood that the memory in the embodiments of this application may be a volatile memory or a nonvolatile memory, or may include both volatile and nonvolatile memories. In some embodiments, the non-volatile memory may be Read-Only Memory (ROM), Programmable ROM (PROM), Erasable PROM (EPROM), Electrically EPROM (EEPROM) or flash. The volatile memory may be Random Access Memory (RAM), which acts as external cache memory. By way of illustration and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memory of the systems and methods described herein is intended to include, but not be limited to, these and any other suitable types of memory.

Figure 19:
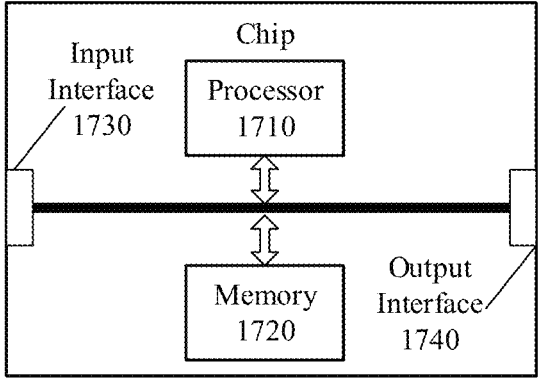
FIG. 19 is a schematic structural diagram of a chip according to some embodiments of this application.

FIG. 19 is a schematic structural diagram of a chip according to some embodiments of this application. The chip 1700 shown in FIG. 19 includes a processor 1710, and the processor 1710 can invoke and run a computer program from a memory 1720, so as to implement the method according to some embodiments of this application.

Optionally, as shown in FIG. 19, the chip 1700 may further include a memory 1720. Herein, the processor 1710 can invoke and run a computer program from the memory 1720, so as to implement the method according to some embodiments of this application.

Herein, the memory 1720 may be an independent device independent of the processor 1710, or may be integrated in the processor 1710.

Optionally, the chip 1700 may also include an input interface 1730. Herein, the processor 1710 can control the input interface 1730 to communicate with other devices or chips, specifically, can obtain information or data sent by other devices or chips.

Optionally, the chip 1700 may also include an output interface 1740. Herein, the processor 1710 can control the output interface 1740 to communicate with other devices or chips, specifically, can output information or data to other devices or chips.

Optionally, the chip can be applied to the terminal device/ network device according to some embodiments of this application, and the chip can implement the corresponding processes implemented by the terminal device/network device in each method according to some embodiments of this application. For the sake of brevity, details will not be repeated here.

It should be understood that the chip according to some embodiments of this application may also be called a system level chip, a system chip, a chip system, or a system-on-chip.

Figure 20:
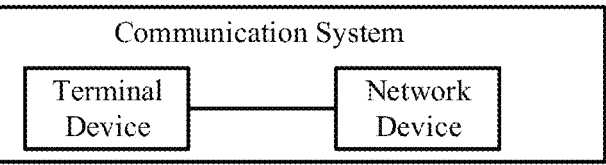
FIG. 20 is a schematic diagram of a communication system according to some embodiments of this application.

FIG. 20 is a schematic diagram of a communication system according to some embodiments of this application. As shown in FIG. 20, the communication system includes a terminal device and a network device.

Herein, the terminal device can be configured to implement the corresponding functions realized by the terminal device in the above method, and the network device can be configured to implement the corresponding functions realized by the network device in the above method. For the sake of brevity, details are not repeated here.

Some embodiments of this application also provide a computer-readable storage medium, where the computer-readable storage medium stores a computer program for electronic data exchange, and the computer program enables a terminal device or a network device to perform part or all of the steps described in the above method embodiments related to the terminal device or the network device.

Some embodiments of this application also provide a computer program product, where the computer program product includes a non-transitory computer-readable storage medium storing a computer program, and the computer program is operable to enable a terminal device or a network device to perform part or all of the steps described in the above method embodiments related to the terminal device or the network device. The computer program product may be a software installation package.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may use different methods to implement the described functions for each specific application, but such implementation should not be regarded as exceeding the scope of this application.

Those skilled in the art can clearly understand that for the convenience and brevity of the description, the specific working process of the above-described system, device and unit can refer to the corresponding process in the foregoing method embodiments, which will not be repeated here.

In the several embodiments provided in this application, it should be understood that the disclosed systems, devices and methods may be implemented in other manners. For example, the device embodiments described above are only illustrative. For example, the division of the units is only a logical function division. In actual implementation, there may be other division manners. For example, multiple units or components may be combined or may be integrated into another system; some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may be or may not be physically separated, and the components shown as units may be or may not be physical units, that is, they may be located in one place, or may be distributed to multiple network units. Part or all of the units can be selected according to actual needs to achieve the purpose of the solution according to some embodiments.

In addition, each functional unit according to some embodiments of this application may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, essential part of the technical solution of this application, or the part thereof that contributes to the prior art, or any part of the technical solution can be embodied in the form of a software product, and the computer software product is stored in a storage medium, including several instructions enabling a computer device (which may be a personal computer, a server, or a network device, etc.) to implement all or part of the steps of the methods described in the various embodiments of this application. The aforementioned storage medium includes U disk, mobile hard disk, ROM, RAM, magnetic disk optical disc, or the like which can store program codes.

The above is only a specific implementation of the application, but the protection scope of the application is not limited thereto. Anyone familiar with the technical field can easily think of changes or substitutions within the technical scope disclosed in the application, which shall fall within the protection scope of this application. Therefore, the protection scope of this application should be based on the protection scope of the claims.

What is claimed is:

1. A method for time synchronization, applied to a terminal device, comprising:
sending first information to a network device, wherein the first information is configured to indicate a propagation delay compensation mode supported by the terminal device;
receiving second information from the network device; and
performing propagation delay compensation according to a target propagation delay compensation mode related to the second information;
wherein the target propagation delay compensation mode is one of the propagation delay compensation mode supported by the terminal device, or the target propagation delay compensation mode is a propagation delay compensation mode autonomously determined by the terminal device.

2. The method according to claim 1, wherein the target propagation delay compensation mode is one of a propagation delay compensation mode requested by the terminal device among the propagation delay compensation mode supported by the terminal device;
wherein, before receiving the second information from the network device, the method further comprises:
sending third information to the network device, wherein the third information is used by the network device to determine the propagation delay compensation mode requested by the terminal device.

3. The method according to claim 2, wherein the third information indicates the target propagation delay compensation mode.

4. The method according to claim 1, wherein the second information is configured to trigger the terminal device to perform the propagation delay compensation.

5. The method according to claim 1, wherein the second information comprises first propagation delay compensation mode indication information, and the first propagation delay compensation mode indication information is configured to indicate the target propagation delay compensation mode.

6. The method according to claim 5, wherein the second information comprises first compensation amount information, and the first compensation amount information is used by the terminal device to determine a compensation amount corresponding to the target propagation delay compensation mode.

7. The method according to claim 1, wherein the second information is used for configuring an available propagation delay compensation mode of the terminal device, and the available propagation delay compensation mode comprises the target propagation delay compensation mode.

8. A terminal device, comprising:
a processor, a memory, a communication interface, and one or more programs stored in the memory, wherein when the one or more programs are executed by the processor, the terminal device is caused to:
configure the communication interface to send first information to a network device, wherein the first information is configured to indicate a propagation delay compensation mode supported by the terminal device;
configure the communication interface to receive second information from the network device; and
perform propagation delay compensation according to a target propagation delay compensation mode related to the second information;
wherein the target propagation delay compensation mode is one of the propagation delay compensation mode supported by the terminal device, or the target propagation delay compensation mode is a propagation delay compensation mode autonomously determined by the terminal device.

9. The terminal device according to claim 8, wherein the target propagation delay compensation mode is one of a propagation delay compensation mode requested by the terminal device among the propagation delay compensation mode supported by the terminal device;
wherein, before receiving the second information from the network device, the communication interface is further configured to:
send third information to the network device, wherein the third information is used by the network device to determine the propagation delay compensation mode requested by the terminal device.

10. The terminal device according to claim 8, wherein the second information is configured to trigger the terminal device to perform the propagation delay compensation.

11. The terminal device according to claim 8, wherein the second information comprises first propagation delay compensation mode indication information, and the first propagation delay compensation mode indication information is configured to indicate the target propagation delay compensation mode.

12. The terminal device according to claim 11, wherein the second information comprises first compensation amount information, and the first compensation amount information is used by the terminal device to determine a compensation amount corresponding to the target propagation delay compensation mode.

13. The terminal device according to claim 8, wherein the second information is used for configuring an available propagation delay compensation mode of the terminal device, and the available propagation delay compensation mode comprises the target propagation delay compensation mode.

14. A network device, comprising:
a processor, a memory, a communication interface, and one or more programs stored in the memory, wherein when the one or more programs are executed by the processor, the network device is caused to:
configure the communication interface to receive first information from a terminal device, wherein the first information is configured to indicate a propagation delay compensation mode supported by the terminal device; and
configure the communication interface to send second information to the terminal device, wherein the second information is used by the terminal device to perform propagation delay compensation according to a target propagation delay compensation mode related to the second information;

wherein the target propagation delay compensation mode is one of the propagation delay compensation mode supported by the terminal device, or the target propagation delay compensation mode is a propagation delay compensation mode autonomously determined by the terminal device.

15. The network device according to claim 14, wherein the target propagation delay compensation mode is one of a propagation delay compensation mode requested by the terminal device among the propagation delay compensation mode supported by the terminal device;

wherein, before sending the second information to the terminal device, the communication interface is further configured to:

receive third information from the terminal device, wherein the third information is used by the network device to determine the propagation delay compensation mode requested by the terminal device.

16. The network device according to claim 15, wherein the third information indicates the target propagation delay compensation mode.

17. The network device according to claim 14, wherein the second information is configured to trigger the terminal device to perform the propagation delay compensation.

18. The network device according to claim 14, wherein the second information comprises first propagation delay compensation mode indication information, and the first propagation delay compensation mode indication information is configured to indicate the target propagation delay compensation mode.

19. The network device according to claim 18, wherein the second information comprises first compensation amount information, and the first compensation amount information is used by the terminal device to determine a compensation amount corresponding to the target propagation delay compensation mode.

20. The network device according to claim 14, wherein the second information is used for configuring an available propagation delay compensation mode of the terminal device, and the available propagation delay compensation mode comprises the target propagation delay compensation mode.

* * * * *